(12) United States Patent
Al-Rfou et al.

(10) Patent No.: US 12,497,079 B2
(45) Date of Patent: Dec. 16, 2025

(54) TRAJECTORY PREDICTION USING EFFICIENT ATTENTION NEURAL NETWORKS

(71) Applicant: Waymo LLC, Mountain View, CA (US)

(72) Inventors: Rami Al-Rfou, Menlo Park, CA (US); Nigamaa Nayakanti, San Jose, CA (US); Kratarth Goel, Fremont, CA (US); Aurick Qikun Zhou, San Francisco, CA (US); Benjamin Sapp, Marina del Rey, CA (US); Khaled Refaat, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 127 days.

(21) Appl. No.: 18/335,915

(22) Filed: Jun. 15, 2023

(65) Prior Publication Data
US 2023/0406360 A1   Dec. 21, 2023

Related U.S. Application Data

(60) Provisional application No. 63/352,623, filed on Jun. 15, 2022.

(51) Int. Cl.
*B60W 60/00* (2020.01)
*B60W 40/04* (2006.01)
(Continued)

(52) U.S. Cl.
CPC ........ *B60W 60/0027* (2020.02); *B60W 40/04* (2013.01); *B60W 40/06* (2013.01); *G06N 3/0455* (2023.01); *B60W 2556/10* (2020.02)

(58) Field of Classification Search
CPC .. B60W 60/0027; B60W 40/04; B60W 40/06; B60W 2556/10; B60W 30/12;
(Continued)

(56) References Cited

U.S. PATENT DOCUMENTS 10,739,775 B2 * 8/2020 Sun ...................... G05D 1/0088
11,610,423 B2 * 3/2023 Mao ........................ G06T 7/246
(Continued)

OTHER PUBLICATIONS

Xiangyu Zou et al., Multi-Modal Pedestrian Trajectory Prediction for Edge Agents Based on Spatial-Temporal Graph, Apr. 2020, IEEE Explore, pp. 83321-83332.*
(Continued)

*Primary Examiner* — Manglesh M Patel
(74) *Attorney, Agent, or Firm* — Fish & Richardson P.C.

(57) ABSTRACT

Methods, systems, and apparatus for generating trajectory predictions for one or more target agents. In one aspect, a system comprises one or more computers configured to obtain scene context data characterizing a scene in an environment at a current time point, where the scene includes multiple agents that include a target agent and one or more context agents, and the scene context data includes respective context data for each of multiple different modalities of context data. The one or more computers then generate an encoded representation of the scene in the environment that includes one or more embeddings and process the encoded representation of the scene context data using a decoder neural network to generate a trajectory prediction output for the target agent that predicts a future trajectory of the target after the current time point.

25 Claims, 6 Drawing Sheets

(51) Int. Cl.
*B60W 40/06* (2012.01)
*G06N 3/0455* (2023.01)

(58) Field of Classification Search
CPC .. B60W 30/16; B60W 30/162; B60W 30/165; B60W 30/17; B60W 30/182; B60W 50/082; G06N 3/0455; G06N 3/045; G05D 1/0061; G05D 1/0088; G05D 1/021; G05D 1/0214; G05D 1/0221; G05D 1/0223; B60K 28/00; B60K 28/165
USPC .......................................... 701/23, 25, 524
See application file for complete search history.

(56) References Cited

U.S. PATENT DOCUMENTS

| | | | |
|---|---|---|---|
| 11,731,663 B2* | 8/2023 | Zeng | B60W 40/072 701/23 |
| 11,780,472 B2* | 10/2023 | Li | G06N 3/045 701/23 |
| 11,807,233 B1* | 11/2023 | Clawson | B60W 30/09 |
| 11,987,265 B1* | 5/2024 | Zhao | G06N 3/08 |
| 12,112,623 B1* | 10/2024 | Zhang | G08G 1/0133 |
| 12,282,328 B2* | 4/2025 | Urtasun | B60W 60/001 |
| 2019/0228316 A1* | 7/2019 | Felsen | G06N 5/02 |
| 2019/0302767 A1* | 10/2019 | Sapp | G08G 1/166 |
| 2020/0090006 A1* | 3/2020 | Wierstra | G06N 3/08 |
| 2021/0001897 A1* | 1/2021 | Chai | G06N 3/045 |
| 2021/0248460 A1* | 8/2021 | Sykora | G06N 3/08 |
| 2021/0312177 A1* | 10/2021 | Bansal | B60W 60/00274 |
| 2021/0403056 A1* | 12/2021 | McGill | G06N 3/042 |
| 2022/0048503 A1* | 2/2022 | Khandelwal | B60W 30/0956 |
| 2022/0135086 A1* | 5/2022 | Mahjourian | B60W 60/00272 701/23 |
| 2022/0153307 A1* | 5/2022 | Choi | G06V 10/82 |
| 2022/0164350 A1* | 5/2022 | Gao | G08G 1/0104 |
| 2022/0297728 A1* | 9/2022 | Varadarajan | G06V 10/82 |
| 2023/0040006 A1* | 2/2023 | Weiss | G06N 20/00 |
| 2023/0343107 A1* | 10/2023 | Bansal | G06V 10/62 |
| 2023/0406361 A1* | 12/2023 | Luo | B60W 60/00274 |
| 2024/0157979 A1* | 5/2024 | Jiang | B60W 50/0097 |
| 2024/0217548 A1* | 7/2024 | Pronovost | G06N 20/00 |
| 2024/0267695 A1* | 8/2024 | Xu | G06T 17/00 |
| 2024/0300542 A1* | 9/2024 | Seff | B60W 60/0027 |
| 2024/0362923 A1* | 10/2024 | Xu | G06T 7/246 |
| 2024/0409126 A1* | 12/2024 | Marchetti-Bowick | G06N 3/08 |

OTHER PUBLICATIONS

Ce Zhang et al., Attention-based Neural Network for Driving Environment Complexity Perception, Jun. 2021, arxiv.org, pp. 1-7 (pdf).*
Alahi et al., "Social LSTM: Human Trajectory Prediction in Crowded Spaces," Proceedings of the IEEE Conference on Computer Vision and Pattern Recognition (CVPR), Jun. 26-Jul. 1, 2016, pp. 961-971.
Arnab et al., "Vivit: A video vision transformer," Proceedings of the IEEE/CVF International Conference on Computer Vision (ICCV), Oct. 2021, pp. 6836-6846.
Bello et al., "Attention augmented convolutional networks," CoRR, submitted on Apr. 22, 2019, arXiv: 1904.09925v1, 12 pages.
Brown et al., "Language models are few-shot learners," CoRR, submitted on Jul. 22, 2020, arXiv:2005,14165v4, 75 pages.
Carion et al., "End-to-end object detection with transformers," Proceeding of European conference on computer vision, Aug. 23, 2020, pp. 213-229.
Casas et al., "Intentnet: Learning to predict intention from raw sensor data," Proceedings of the 2nd Conference on Robot Learning (PMLR), Oct. 23, 2018, 87:947-956.
Casas et al., "Spagnn: Spatially-aware graph neural networks for relational behavior forecasting from sensor data," CoRR, submitted on Oct. 18, 2019, arXiv:1910.08233v1, 11 pages.
Chai et al., "Multipath: Multiple probabilistic anchor trajectory hypotheses for behavior prediction," Proceedings of the Conference on Robot Learning (PMLR), Nov. 2019, 100:86-99.
Chang et al., "Argoverse: 3d tracking and forecasting with rich maps," CoRR, submitted on Nov. 6, 2019, arXiv:1911.02620v1, 18 pages.
Cui et al., "Multimodal trajectory predictions for autonomous driving using deep convolutional networks," 2019 International Conference on Robotics and Automation (ICRA), May 20-24, 2019, pp. 2090-2096.
Devlin et al., "BERT: Pre-training of deep bidirectional transformers for language understanding," CoRR, submitted on Oct. 11, 2018, arXiv:1810.04805v1, 14 pages.
Ettinger et al., "Large scale interactive motion forecasting for autonomous driving: The waymo open motion dataset," CoRR, submitted on Apr. 20, 2021, arXiv:2104.10133v1, 15 pages.
Gao et al., "VectorNet: Encoding HD Maps and Agent Dynamics from Vectorized Representation," Proceedings of the IEEE/CVF Conference on Computer Vision and Pattern Recognition, Jun. 13-19, 2020, pp. 11525-1153.
Girgis et al., "Latent Variable Sequential Set Transformer for Joint Multi-Agent Motion Prediction," CoRR, submitted on Feb. 11, 2022, arXiv:2104.00563v3, 26 pages.
Gu et al., "DenseTNT: End-to-end trajectory prediction from dense goal sets," CoRR, submitted on Nov. 24, 2021, arXiv:2108.09640v2, 12 pages.
Gupta et al., "Social GAN: Socially Acceptable Trajectories with Generative Adversarial Networks," Proceedings of the IEEE Conference on Computer Vision and Pattern Recognition (CVPR), Jun. 2018, pp. 2255-2264.
Ho et al., "Axial attention in multidimensional transformers," CoRR, submitted on Dec. 20, 2019, arXiv:1912.12180v1, 11 pages.
Hong et al., "Rules of the road: Predicting driving behavior with a convolutional model of semantic interactions," CoRR, submitted on Jun. 21, 2019, arXiv:1906.08945v1, 9 pages.
Houston et al., "One thousand and one hours: Self-driving motion prediction dataset," CoRR, submitted on Nov. 16, 2020, arXiv:2006.14480v2, 10 pages.
Huang et al., "STGAT: Modeling spatial-temporal interactions for human trajectory prediction," Proceedings of the IEEE/CVF International Conference on Computer Vision (ICCV), Oct. 27-Nov. 2, 2019, pp. 6272-6281.
Hung et al., "SoDA: Multi-object tracking with soft data association," CoRR, submitted on Aug. 18, 2020, arXiv:2008.07725v1, 13 pages.
Jaegle et al., "Perceiver IO: A general architecture for structured inputs & outputs," CoRR, submitted on Jul. 30, 2021, arXiv:2107.14795v1, 24 pages.
Jaegle et al., "Perceiver: General perception with iterative attention," International conference on machine learning (PMLR), Jul. 1, 2021, pp. 4651-4664.
Kaplan et al., "Scaling laws for neural language models," CoRR, submitted on Jan. 23, 2020, arXiv:2001.08361v1, 30 pages.
Khandelwal et al., "What-if motion prediction for autonomous driving," CoRR, submitted on Aug. 24, 2020, arXiv:2008.10587v1, 16 pages.
Kosaraju et al., "Social-BIGAT: Multimodal trajectory forecasting using bicycle-GAN and graph attention networks," Proceedings of the 33rd International Conference on Neural Information Processing Systems, Dec. 2019, pp. 137-146.
Lee et al., "DESIRE: distant future prediction in dynamic scenes with interacting agents," CoRR, submitted on Apr. 14, 2017, arXiv:1704.04394v1, 10 pages.
Lee et al., "Set transformer: A framework for attention-based permutation-invariant neural networks," International conference on machine learning (PMLR), May 24, 2019, pp. 3744-3753.
Liang et al., "Learning lane graph representations for motion forecasting," CoRR, submitted on Jul. 27, 2020, arXiv:2007.13732v1, 18 pages.
Liang et al., "The garden of forking paths: Towards multi-future trajectory prediction," Proceedings of the IEEE/CVF Conference on Computer Vision and Pattern Recognition, Jun. 13-19, 2020, pp. 10508-10518.

(56) References Cited

OTHER PUBLICATIONS

Liu et al., "Multimodal motion prediction with stacked transformers," Proceedings of the IEEE/CVF Conference on Computer Vision and Pattern Recognition (CVPR), Jun. 19-25, 2021, pp. 7577-7586.
Loshchilov et al., "Decoupled weight decay regularization," International Conference on Learning Representations (ICLR), May 6-9, 2019, 18 pages.
Mercat et al., "Multi-head attention for multi-modal joint vehicle motion forecasting," 2020 IEEE International Conference on Robotics and Automation (ICRA), May 31, 2020, pp. 9638-9644.
Ngiam et al., "Scene Transformer: A unified architecture for predicting multiple agent trajectories," CoRR, submitted on Mar. 4, 2022, arXiv:2106.08417v3, 25 pages.
Ramachandran et al., "Stand-alone self-attention in vision models," CoRR, submitted on Jun. 13, 2019, arXiv:1906.05909v1, 15 pages.
Rhinehart et al. "PRECOG: PREdiction Conditioned on Goals in Visual Multi-Agent Settings," Proceedings of the IEEE/CVF International Conference on Computer Vision (ICCV), Oct. 27-Nov. 2, 2019, pp. 2821-2830.
Rhinehart et al., "R2p2: A reparameterized pushforward policy for diverse, precise generative path forecasting," Proceedings of the European Conference on Computer Vision (ECCV), Sep. 8-14, 2018, pp. 794-811.
Salzmann et al., "Trajectron++: Multi-agent generative trajectory forecasting with heterogeneous data for control," CoRR, submitted on Jan. 9, 2020, arXiv:2001.03093v1, 13 pages.
Srinivas et al., "Bottleneck transformers for visual recognition," CoRR, submitted on Aug. 2, 2021, arXiv:2101.11605v2, 11 pages.
Tang et al., "Multiple futures prediction," Proceedings of the 33rd International Conference on Neural Information Processing Systems, Dec. 2019, pp. 15424-15434.
Tay et al., "Efficient transformers: A survey," CoRR, submitted on Sep. 14, 2020, arXiv:2009.06732v1, 28 pages.
Tay et al., "Long range arena: A benchmark for efficient transformers," CoRR, Nov. 8, 2020, arXiv:2011.04006v1, 16 pages.
Varadarajan et al., "Multipath++: Efficient information fusion and trajectory aggregation for behavior prediction," CoRR, submitted on Dec. 22, 2021, arXiv:2111.14973v3, 22 pages.
Vaswani et al., "Attention is all you need," Proceedings of the 31st International Conference on Neural Information Processing Systems, Dec. 2017, pp. 6000-6010.
Ye et al., "DCMS: Motion Forecasting with Dual Consistency and Multi-Pseudo-Target Supervision," CoRR, submitted on Feb. 28, 2023, arXiv:2204.05859v2, 18 pages.
Ye et al., "TPCN: Temporal Point Cloud Networks for Motion Forecasting," Proceedings of the IEEE/CVF Conference on Computer Vision and Pattern Recognition (CVPR), Jun. 19-25, 2021, pp. 11318-11327.
Yu et al., "Spatio-temporal graph transformer networks for pedestrian trajectory prediction," proceeding of European Conference on Computer Vision (ECCV), Aug. 23-28, 2020, pp. 507-523.
Yuan et al., "Agentformer: Agent-aware transformers for sociotemporal multi-agent forecasting," CoRR, submitted on Oct. 7, 2021, arXiv:2103.14023v3, 14 pages.
Zeng et al., "End-to-end interpretable neural motion planner," Proceedings of the IEEE/CVF Conference on Computer Vision and Pattern Recognition, Jun. 15-20, 2019, pp. 8660-8669.
Zeng et al., "LaneRCNN: Distributed representations for graph-centric motion forecasting," CoRR, submitted on Jan. 17, 2021, arXiv:2101.06653v1, 14 pages.
Zhao et al., "TNT: Target-driveN trajectory prediction," CoRR, submitted on Aug. 19, 2020, arXiv:2008.08294v1, 12 pages.

* cited by examiner

TRAJECTORY PREDICTION USING EFFICIENT ATTENTION NEURAL NETWORKS

CROSS-REFERENCE TO RELATED APPLICATION

This application claims priority to U.S. Provisional Application No. 63/352,623, filed on Jun. 15, 2022. The disclosure of the prior application is considered part of and is incorporated by reference in the disclosure of this application.

BACKGROUND

This specification relates to predicting the future trajectory of an agent in an environment.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current value inputs of a respective set of parameters.

BRIEF DESCRIPTION OF THE DRAWINGS

Like reference numbers and designations in the various drawings indicate like elements.

DETAILED DESCRIPTION

Figure 1:
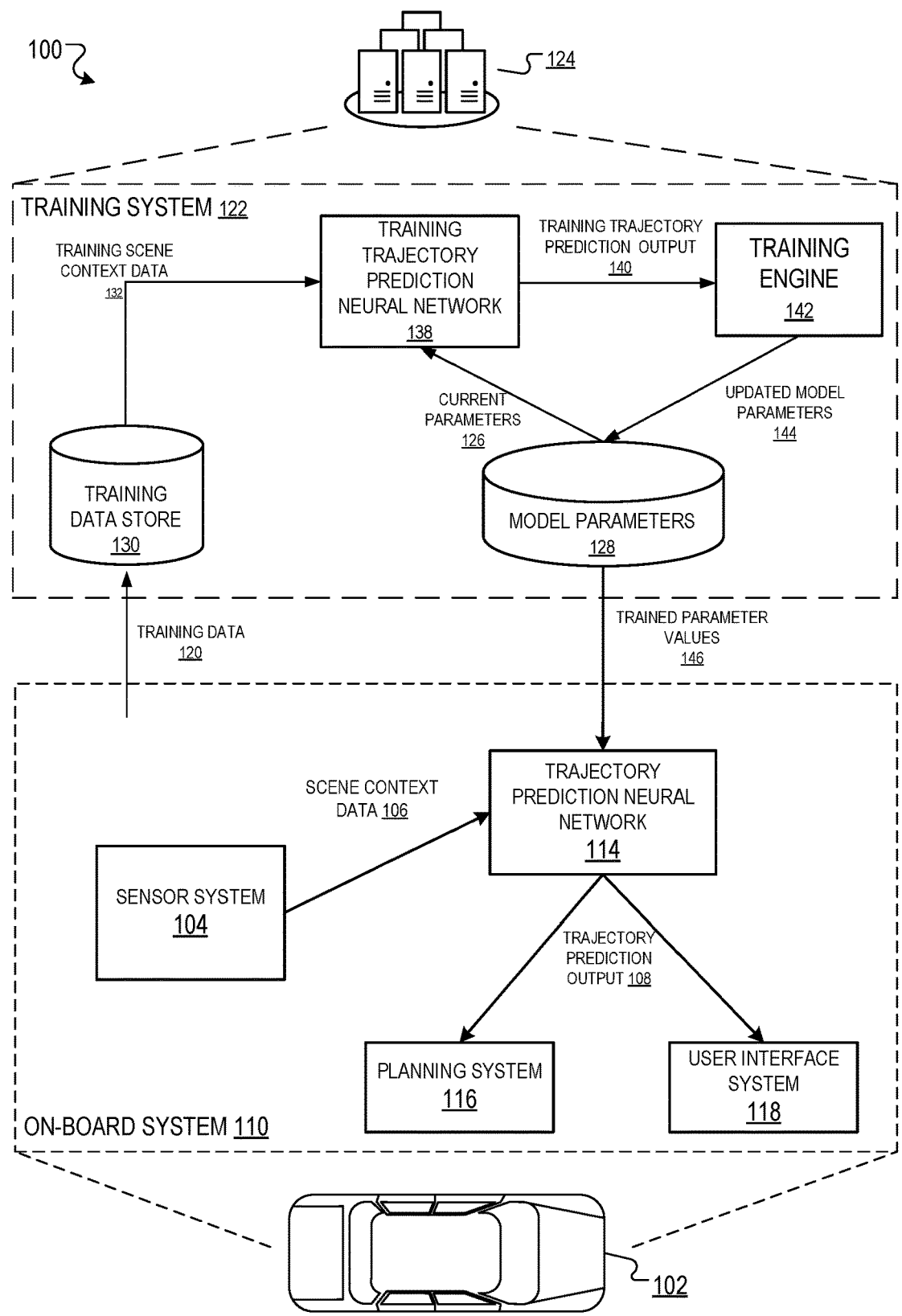
FIG. 1 is a block diagram of an example system.

This specification describes a system implemented as computer programs on one or more computers in one or more locations that generates trajectory predictions for one or more target agents, e.g., a vehicle, a cyclist, or a pedestrian, in an environment. Each trajectory prediction is a prediction that defines the future trajectory of the corresponding target agent starting from a current time point.

For example, the trajectory predictions may be made by an on-board computer system of an autonomous vehicle navigating through the environment and the target agents may be agents that have been detected by the sensors of the autonomous vehicle. The behavior predictions can then be used by the on-board system to control the autonomous vehicle, i.e., to plan the future motion of the vehicle based in part on the likely future motion of other agents in the environment.

As another example, the trajectory predictions may be made in a computer simulation of a real-world environment being navigated through by a simulated autonomous vehicle and the target agents. Generating these predictions in simulation may assist in controlling the simulated vehicle, in testing the realism of certain situations encountered in the simulation, and in ensuring that the simulation includes surprising interactions that are likely to be encountered in the real-world.

Conventional systems attempt to represent driving scenarios with multiple modalities of features in order to generate trajectory prediction outputs. The multiple modalities can include a variety of static inputs and dynamic inputs, such as information about road geometry and lane connectivity, time-varying traffic light states, and the history of other agents and their interactions.

However, effectively incorporating information from all of these different modalities is difficult. That is, while all of these different modalities provide information that is useful in predicting trajectories, it is difficult to generate a representation of a scene that effectively incorporates information from these modalities.

Some conventional systems attempt to model the complex set of multimodal inputs by designing an equally complex system with multiple modality modules. However, the complexity of the design results in systems that are difficult to scale, extend, or tune while preserving accuracy and efficiency.

Additionally, conventional systems may be unable to accurately generate possible trajectory prediction outputs because the trajectory prediction output can be highly unstructured and multimodal. For example, an agent could carry out one of many routes based on traffic light states, which can be unknown to another agent in an environment. As such, a system may be unable to generate a complete distribution of diverse possible trajectories.

To mitigate these issues, this specification describes a system that can efficiently process the multimodal inputs using a simple and effective framework that avoids complex architectures. In particular, the system described includes a scene encoder that can fuse one or more modalities across temporal and spatial dimensions and a trajectory decoder that can cross attend representations of these multimodal inputs that are generated by the scene encoder to produce an accurate and diverse set of predicted future trajectories for a given agent. In particular, the described model architecture results in a simpler implementation and allows for improved model quality, which decreases latency and increases the accuracy of the trajectory prediction output, e.g., when deployed on-board an autonomous vehicle.

FIG. 1 shows an example system 100. The system 100 includes an on-board system 110 and a training system 122.

The on-board system 110 is located on-board a vehicle 102. The vehicle 102 in FIG. 1 is illustrated as an automobile, but the on-board system 110 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 102 can alert the driver of the vehicle 102 or take an autonomous driving action when an obstacle is detected, when the vehicle departs from a driving lane, or when an object is detected in a blind spot of the human driver.

The on-board system 110 includes a sensor system 104 which enables the on-board system 110 to "see" the environment in the vicinity of the vehicle 102. More specifically, the sensor system 104 includes one or more sensors, some of which are configured to receive reflections of electromagnetic radiation from the environment in the vicinity of the vehicle 102. For example, the sensor system 104 can include one or more laser sensors (e.g., LIDAR laser sensors) that are configured to detect reflections of laser light. As another example, the sensor system 104 can include one or more radar sensors that are configured to detect reflections of radio waves. As another example, the sensor system 104 can include one or more camera sensors that are configured to detect reflections of visible light.

The sensor system 104 continually (i.e., at each of multiple time points) captures raw sensor data, which can indicate the directions, intensities, and distances travelled by reflected radiation. For example, a sensor in the sensor system 104 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

The on-board system 110 can process the raw sensor data to generate scene context data 106.

The scene context data 106 characterizes a scene in an environment, e.g., an area of the environment that includes the area within a threshold distance of the autonomous vehicle or the area that is within range of at least one sensor of the vehicle.

Generally, the scene context data 106 includes multiple modalities of features that describe the scene in the environment. A modality, as used in this specification, refers to a feature that provides a particular type of information about the environment. Thus, different modalities provide different types of information about the environment. For example, the scene context data 106 can include features from two or more of the following modalities: a traffic light state modality that provides information about a traffic light state of traffic lights in the environment, a road graph data modality that provides static information about the roadways in the environment, an agent history modality that provides information about the current and previous positions of agents in the environment, and an agent interaction modality that provides information about interactions between agents in the environment.

In some examples, the scene context data 106 includes data that would be captured one or more sensors of a simulated autonomous vehicle in a real-world environment, where a target agent is a simulated agent in the vicinity of the simulated autonomous vehicle in the simulation.

At any given time point, the on-board system 110 can process the scene context data 106 using a trajectory prediction neural network 114 to predict the trajectories of agents (e.g., pedestrians, bicyclists, other vehicles, and the like) in the environment in the vicinity of the vehicle 102.

In particular, the on-board system 110 can generate a respective trajectory prediction output 108 for each of one or more target agents in the scene at the given time point. The trajectory prediction output 108 for a target agent predicts the future trajectory of the target agent after the current time point.

The future trajectory for an agent is a sequence that includes a respective agent state for the agent for each of a plurality of future time points, i.e., time points that are after the current time point. Each agent state identifies at least a waypoint location for the corresponding time point, i.e., identifies a location of the agent at the corresponding time point. In some implementations, each agent state also includes other information about the state of the agent at the corresponding time point, e.g., the predicted heading of the agent at the corresponding time point. The heading of an agent refers to the direction of travel of the agent and can be expressed as angular data (e.g., in the range 0 degrees to 360 degrees) which is defined relative to a given frame of reference in the environment (e.g., a North-South-East-West frame of reference).

The processing performed by the trajectory prediction neural network 114 to generate the trajectory prediction output 108 is described in further detail below with reference to FIGS. 2 and 3.

The on-board system 110 can provide the trajectory prediction output 108 generated by the trajectory prediction neural network 114 to a planning system 116, a user interface system 118, or both.

When the planning system 116 receives the trajectory prediction output 108, the planning system 116 can use the trajectory prediction output 108 to make fully-autonomous or partly-autonomous driving decisions. For example, the planning system 116 can generate a fully-autonomous plan to navigate the vehicle 102 to avoid a collision with another agent by changing the future trajectory of the vehicle 102 to avoid the predicted future trajectory of the agent. In a particular example, the on-board system 110 may provide the planning system 116 with trajectory prediction output 108 indicating that another vehicle which is attempting to merge onto a roadway being travelled by the vehicle 102 is unlikely to yield to the vehicle 102. In this example, the planning system 116 can generate fully-autonomous control outputs to apply the brakes of the vehicle 102 to avoid a collision with the merging vehicle. The fully-autonomous or partly-autonomous driving decisions generated by the planning system 116 can be implemented by a control system of the vehicle 102. For example, in response to receiving a fully-autonomous driving decision generated by the planning system 116 which indicates that the brakes of the vehicle should be applied, the control system may transmit an electronic signal to a braking control unit of the vehicle. In response to receiving the electronic signal, the braking control unit can mechanically apply the brakes of the vehicle.

When the user interface system 118 receives the trajectory prediction output 108, the user interface system 118 can use the trajectory prediction output 108 to present information to the driver of the vehicle 102 to assist the driver in operating the vehicle 102 safely. The user interface system 118 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102). In a particular example, the on-board system 110 may provide the user interface system 118 with trajectory prediction output 108 indicating that another vehicle which is attempting to merge onto a roadway being travelled by the vehicle 102 is unlikely to yield to the vehicle 102. In this example, the user interface system 118 can present an alert message to the driver of the vehicle 102 with Instructions to adjust the trajectory of the vehicle 102 to avoid a collision with the merging vehicle.

Prior to the on-board system 110 using the trajectory prediction neural network 114 to make predictions, a training system 122 can determine trained parameter values of the trajectory prediction neural network 114 by training the neural network 114 on training data.

The training system 122 is typically hosted within a data center 124, which can be a distributed computing system having hundreds or thousands of computers in one or more locations.

The training system 122 can store the training data 120 in a training data store 130.

The training system 122 includes a training trajectory prediction neural network 138 that is configured to generate behavior prediction data from input scene context data. The training behavior prediction neural network 238 generally has (at least partially) the same architecture as the on-board trajectory prediction neural network 114, The training trajectory prediction neural network 138 is configured to obtain training scene context data 132 from the training data store 130. The training scene context data 132 can be a subset of the training data 120. The training scene context data 132 in the training data store 130 may be obtained from real or simulated driving data logs.

The training scene context data 132 can include data from multiple different modalities. In some cases the context data includes raw sensor data generated by one or more sensors, e.g., a camera sensor, a lidar sensor, or both. In other cases, the context data includes data that has been generated from the outputs of an object detector that processes the raw sensor data.

The training trajectory prediction neural network 138 processes the training scene context data 132 to generate a training trajectory prediction output 140.

The training engine 142 trains the training trajectory prediction neural network 138 on the training scene context data 132 to generate updated model parameter values 144 by minimizing a loss function based on ground truth trajectories for each agent, e.g., a loss function that includes a classification loss and a regression loss, as described in more detail below with reference to FIG. 2.

Once the parameter values of the training trajectory prediction neural network 138 have been fully trained, the training system 122 can send the trained parameter values 146 to the trajectory prediction neural network 114, e.g., through a wired or wireless connection.

While this specification describes that the trajectory prediction output 108 is generated on-board an autonomous vehicle, more generally, the described techniques can be implemented on any system of one or more computers that receives images of scenes in an environment. That is, once the training system 122 has trained the trajectory prediction neural network 114, the trained neural network can be used by any system of one or more computers.

As one example, the trajectory prediction output 108 can be generated on-board a different type of agent that has sensors and that interacts with objects as it navigates through an environment. For example, the trajectory prediction output 108 can be generated by one or more computers embedded within a robot or other agent.

As another example, the trajectory prediction output 108 can be generated by one or more computers that are remote from the agent and that receive images captured by one or more camera sensors of the agent. In some of these examples, the one or more computers can use the trajectory prediction output 108 to generate control decisions for controlling the agent and then provide the control decisions to the agent for execution by the agent.

Figure 2:
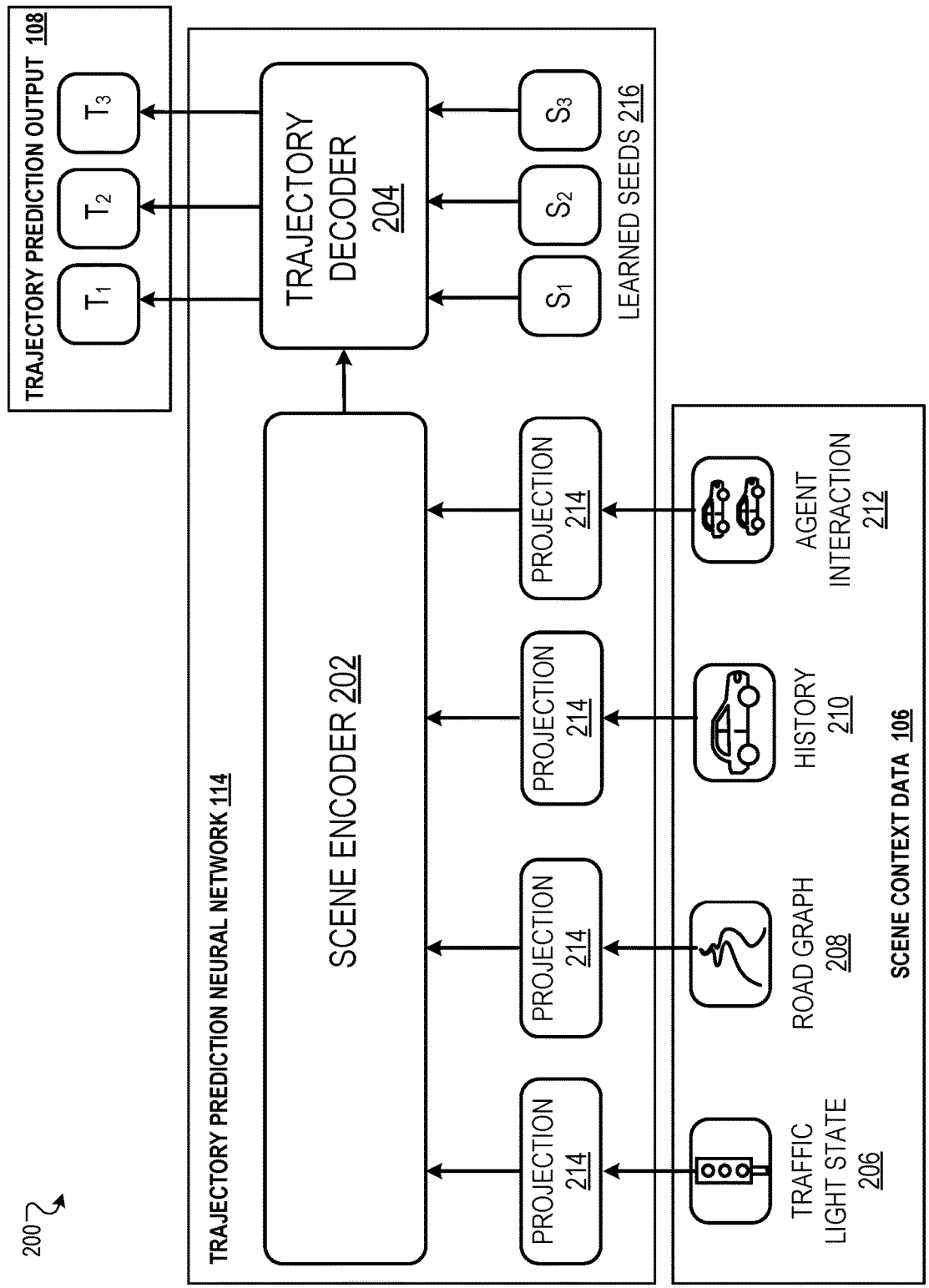
FIG. 2 is a block diagram of an example trajectory prediction neural network.

FIG. 2 shows a block diagram of an example trajectory prediction neural network 114 when being used to predict a future trajectory for a target agent in a scene that includes the target agent and one or more context agents.

The system uses the trajectory prediction neural network 114 to generate a trajectory prediction output 108 by processing scene context data 106. The trajectory prediction neural network 114 includes a scene encoder 202 and a trajectory decoder 204.

The trajectory prediction neural network 114 obtains scene context data 106 that characterizes a scene in an environment at a current time point.

As described above, the scene context data 106 can include multiple modalities of data.

In the example of FIG. 2, the multiple modalities include traffic light state data 206, road graph data 208, agent history data 210, and agent interaction data 212.

The traffic light state data 206 characterizes at least respective current states of one or more traffic signals in the scene. The state of a traffic light at a given time point represents the indication being provided by the traffic signal at the given time point, e.g., whether the traffic light is green, yellow, red, flashing, and so on.

The road graph 208 includes road graph context data characterizing road features in the scene, e.g., driving lanes, crosswalks, and so on.

The history 210 includes target agent history data characterizing current and previous states of each of the one or more target agents. The agent interaction 212 includes context agent history context data characterizing states (e.g., current and previous states) of one or more context agents that are in proximity to the target agent.

The data for each modality that is received by the neural network 114 is represented as a tensor of input elements. In particular, for each agent in the scene, the tensor of input elements is [T, S, D], where T represents the number of previous and current timesteps of the modality, S represents a context dimension, and D represents a feature dimension of each of the input elements. Thus, for any given modality, the data includes S input elements at each of the T timesteps, with each input element having D numeric values. Alternatively, the data can be represented as a sequence of S×T D dimensional input elements.

For example, the sequence of input elements representing the traffic light state 206 is [T, $S_{tls}$, $D_{tls}$], where $S_{tls}$ represents the number of traffic signals/lights and the input element for each traffic signal describes the state of the traffic signal, the position of the traffic signal, and, optionally a confidence of the system that the state of the traffic signal is accurate.

The sequence of input elements representing the road graph 208 is [1, $S_r$, $D_r$], where Sr represents a set of road graph segments. The road graph segments are represented as polylines that approximate a road shape with collections of line segments specified by endpoints and annotated with type information that identifies the type of road feature represented by the element, e.g., driving lane, crosswalk, and so on. $S_r$ can represent a number of segments closest to the target agent. In this case, because this information is static, T is not necessarily relevant for the information of road graph 208, so T is set to 1 to allow for homogeneity with the other modalities.

The sequence of input elements representing the history 210 is [T, 1, $D_h$], where h represents features for each time step t of the timesteps T that define the state of the target agent, such as distance, velocity, acceleration, a bounding box, etc. In this case, S is not necessarily relevant for the information of history 210, so S is set to 1 to allow for homogeneity with the other modalities.

The sequence of input elements representing the agent interaction is [T, $S_i$, $D_i$], where i represents a number of closest context agents in the vicinity of the target agent.

The trajectory prediction neural network 114 generates a projection 214 for each of the sequences of input elements that represent the different modalities of the scene context data 106. In particular, the trajectory prediction neural network 114 projects each of the sequences of input elements such that each of the sequences of input elements have a same dimensionality, D, as shown by Equation 1:

$$\text{Projection}(x_i) = \text{relu}(Wx_i + b) \quad (1)$$

where $x_i$ represents an input element i from a given modality m that has dimensionality Dm, $x_i \in \mathbb{R}^{Dm}$, $b \in \mathbb{R}^D$, and $W \in \mathbb{R}^{D \times Dm}$.

The trajectory prediction neural network 114 processes the projections 214 using the scene encoder 202 to generate an encoded representation of the projections 214. The trajectory prediction neural network 114 then processes the encoded representation using the trajectory decoder 204 to generate the trajectory prediction output 108.

In particular, as part of generating the encoded representation, the trajectory prediction neural network uses the scene encoder 202 to generate a combined sequence by concatenating the respective sequences of the projections 214 for the different modalities along the temporal dimension and the spatial dimension. The trajectory prediction neural network 114 processes the combined sequence using one or more cross-modal attention layers within the scene encoder 202 to generate the encoded representation, which includes one or more embeddings, as described in more detail below with reference to FIG. 3.

The trajectory prediction neural network 114 then processes the encoded representation using a trajectory decoder 204 to generate a trajectory prediction output 108 for the target agent that predicts a future trajectory of the target after the current time point.

Generally, the trajectory decoder 204 can have any appropriate neural network architecture that allows the decoder 204 to map the encoded representation to a trajectory prediction output 108 for the target agent. For example, the trajectory prediction output 108 can define a probability distribution over possible future trajectories of the target agent (e.g., T1, T2, and T3) after the current time point.

In some examples, the trajectory prediction neural network 114 can obtain learned seeds 216 and process the learned seeds 216 along with the encoded representation using the trajectory decoder 204. The learned seeds 216 can be learned initial queries that are learned during the training of the trajectory prediction neural network 114.

In particular, the trajectory decoder 204 can be a self-attention neural network that includes one or more layers that update the learned seeds 216 by applying self-attention over the learned seeds 216 and one or more layers that update the learned seeds 216 by cross-attending over the encoded representation.

In this example, each of the learned seeds 216 corresponds to a mode of multiple modes of a random distribution (e.g., a Gaussian distribution). In this example, the trajectory decoder 204 generates for each mode, a respective probability for the mode and a future trajectory associated with the mode by processing the learned seed 216 for the mode (after being updated using the one or more self-attention layer and the one or more cross-attention layers). For example, the trajectory decoder 204 can include a classification neural network head, e.g., that includes one or more fully-connected layers, that processes each updated learned seed 216 to generate the probability for the learned seed and a regression neural network head, e.g., that includes one or more fully-connected layers, that processes each updated learned seed 216 to generate an output that defines the corresponding trajectory, e.g., by generating means and variances, standard deviations, or logarithms of standard deviations for each time step in the future trajectory.

In some examples, the trajectory prediction neural network 114 can generate the trajectory prediction output 108 for multiple target agents. In this example, the trajectory prediction neural network can perform batching to generate multiple trajectory predictions corresponding to the multiple target agents in parallel.

During training, the trajectory prediction neural network 114 can be trained to process training scene context data to generate a training trajectory prediction output.

Thus, the loss trains trajectory prediction neural network 114 to generate outputs that minimize a distance between the mode of the Gaussian distribution and the respective ground truth trajectory.

In particular, the loss is a sum (e.g., a weighted sum) between a classification loss and a regression loss. The classification loss measures the logarithm of the probability assigned to the mode of the Gaussian distribution that is closest to the ground truth trajectory. The regression loss measures the log of the probability assigned to the ground truth trajectory by the mode that is closest to the ground truth trajectory.

Figure 3:
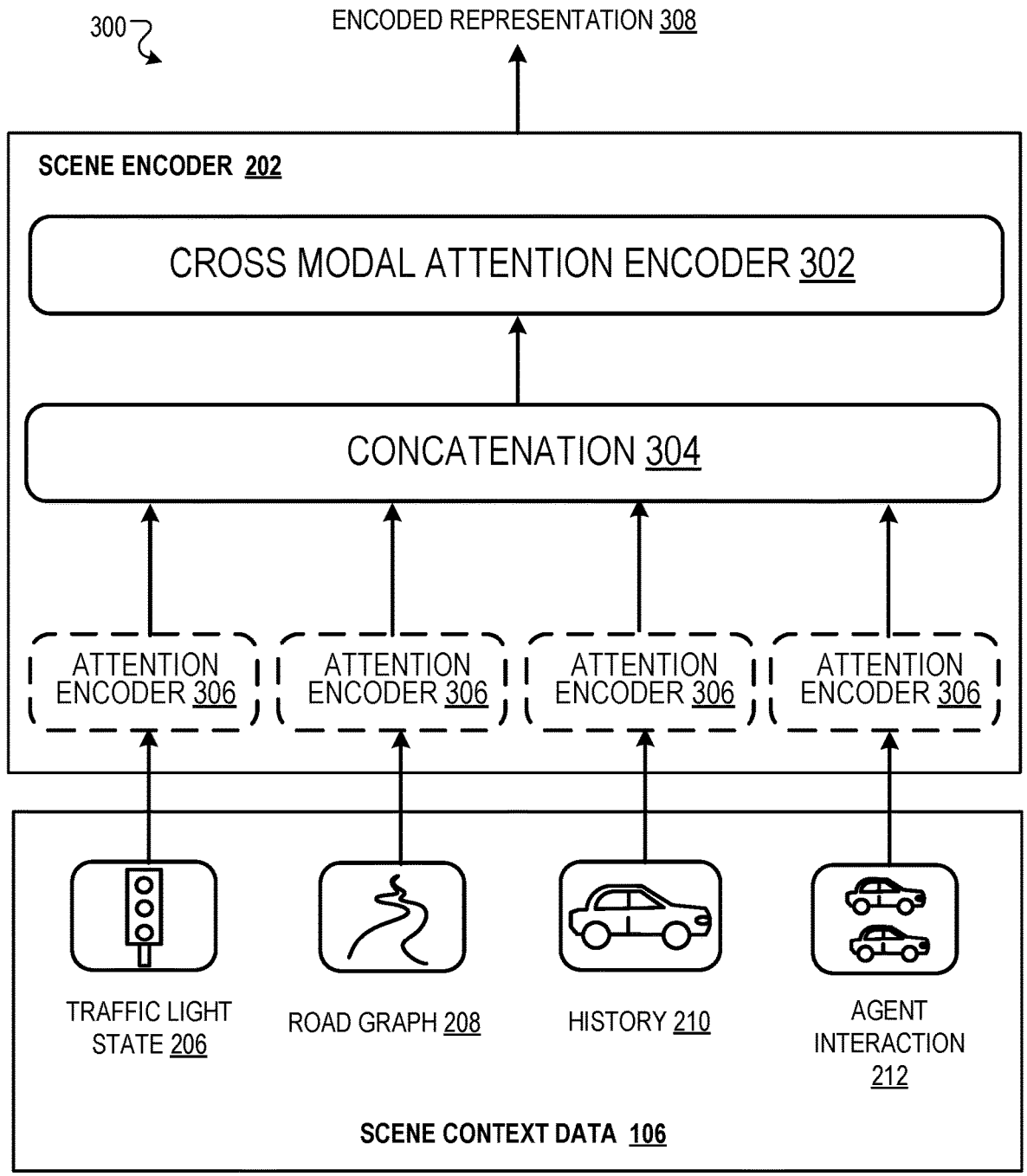
FIG. 3 is a block diagram of an example scene encoder.

FIG. 3 shows a block diagram of an example scene encoder. For convenience, the scene encoder 202 will be described as being implemented by a system of one or more computers located in one or more locations, e.g., the on-board system 110 of FIG. 1.

The scene encoder 202 includes a cross modal attention encoder 302 and a concatenation block 304. In some examples, the scene encoder 202 further includes respective attention encoder 306s for scene context data 106 of each modality of the multiple modalities (e.g., traffic light state 206, road graph 208, history 210, and agent interaction 212).

The scene encoder 202 generates projections of the scene context data 106. As described above, each of the projections is a respective sequence of input elements for the modality from the scene context data 106. In some examples, the scene encoder 202 processes the projections 214 of the multiple modalities by applying a positional embedding to each of the input elements, e.g., by adding a respective positional embedding to the projection of each of the input elements.

Generally, the scene encoder can perform early fusion or hierarchical fusion to process the projections of the scene context data 106 in order to generate an encoded representation 308.

In some examples, the scene encoder 202 performs early fusion by generating a combined sequence of the sequences of input elements. In particular, the scene encoder 202 concatenates the respective sequences of input elements at the concatenation block 304 to generate the combined sequence. That is, the system concatenates the projections without first performing any attention operations, either self-attention within the modalities or cross-modality attention across the modalities. The system can concatenate the projections in any appropriate order, e.g., by grouping the elements by corresponding time point with static feature modality at predetermined positions within the sequence or broadcasted to each of the time points, by grouping the elements by corresponding modalities, or by arranging the elements in another appropriate order.

The scene encoder 202 processes the combined sequence using the cross modal attention encoder 302 to generate the encoded representation 308. The cross modal attention encoder 302 can be a single self-attention encoder that takes the combined sequence as input to generate the encoded representation 308.

The cross modal attention encoder 302 can be a multi-axis attention encoder or a factorized attention encoder. That is, the cross modal attention encoder 302 can include any combination of: one or more multi-axis encoder blocks, one or more multi-axis latent query encoder blocks, one or more temporal cross-modal attention layer blocks that self-attend over input elements corresponding to each of the multiple modalities along the temporal dimension, or one or more temporal spatial cross-modal attention blocks corresponding to each of the multiple modalities along the spatial dimension, as described in further detail with reference to FIGS. 4 and 5.

In some other examples, the scene encoder 202 can perform hierarchical fusion by using respective attention encoders 306 for each modality prior to concatenation to process the projections for each of the multiple modalities. That is, for each modality, the system processes the projection for that modality using a corresponding encoder 306 that applies self-attention to the projections of that modality. In particular, the scene encoder 202 generates an initial sequence of input elements for the modality, and the scene encoder 202 processes the initial sequence using an attention encoder 306 that is specific to the modality to generate the sequence of input elements.

The scene encoder 202 then generates the combined sequence by processing each of the sequences of input elements (after the input elements have been processed using the attention encoders 306) using the concatenation block 304, and the scene encoder 202 uses the cross modal attention encoder 302 to process the combined sequence in order to generate the encoded representation 308.

The trajectory prediction neural network then processes the encoded representation 308 using a trajectory decoder to generate the trajectory prediction output, as described above.

Figure 4:
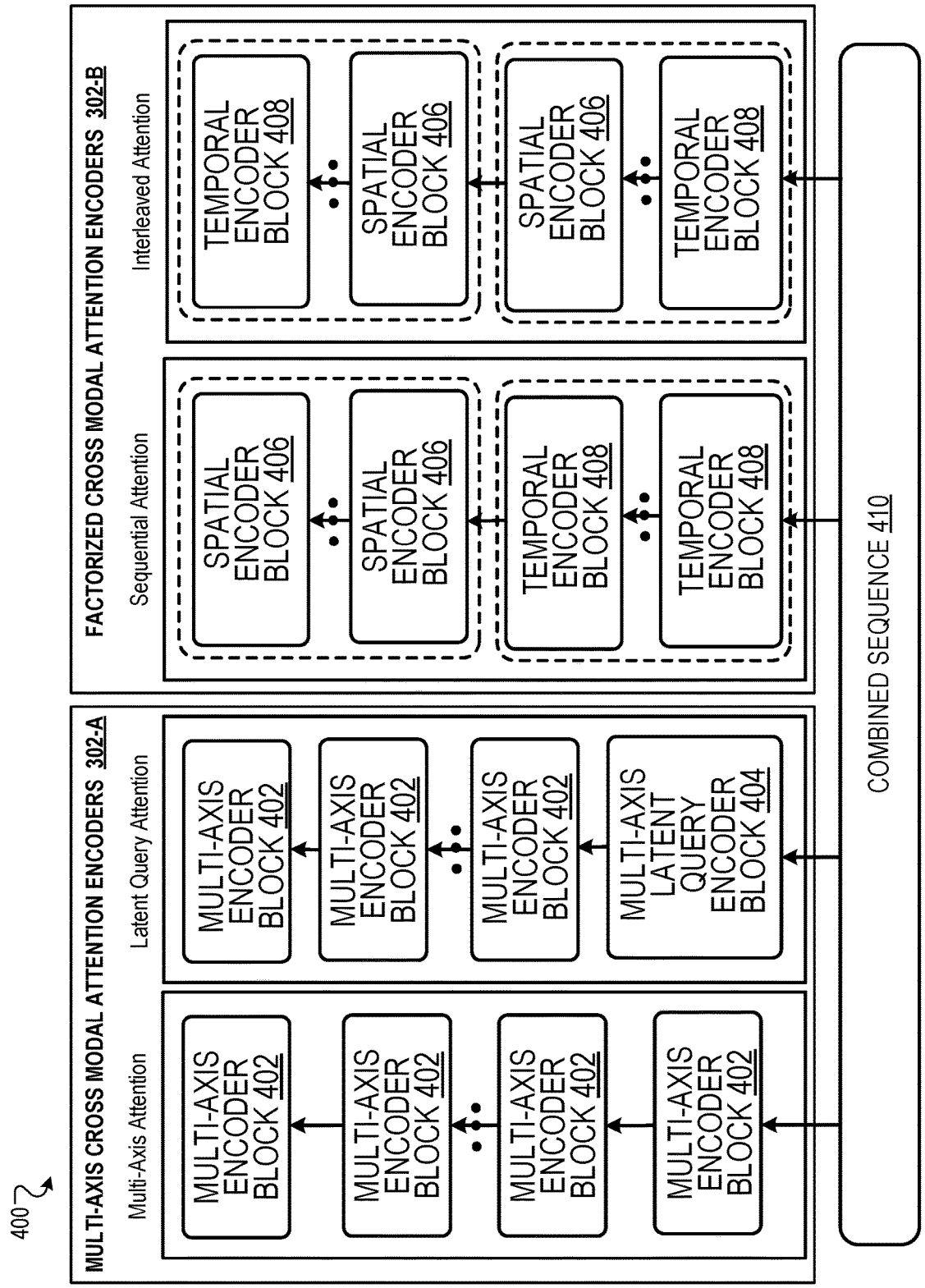
FIG. 4 is a block diagram of example attention encoders.

FIG. 4 is a block diagram of example cross modal attention encoder 302 architectures.

The cross modal attention encoder 302 can be a multi-axis cross modal attention encoder 302-A or a factorized cross modal attention encoder 302-B.

The multi-axis cross modal attention encoder 302-A can have a multi-axis attention architecture or a latent query attention architecture. Depending on the encoder architecture, the multi-axis cross modal attention encoder 302-A can include multiple multi-axis encoder blocks 402, multi-axis latent query encoder blocks 404, or both.

In some examples, the one or more embeddings of the encoded representation 308 include a respective embedding for one or more learned queries. In this example, the cross modal attention encoder 302 receives as input a set of learned queries. Multi-axis cross modal attention encoders 302-A can update the learned queries by applying self-attention over the learned queries. Factorized cross modal attention encoders 302-B can update the learned queries by applying cross-attention between the learned queries and the sequence of input elements.

The multi-axis cross modal attention encoder 302-A with multi-axis attention architecture includes multiple multi-axis encoder blocks 402. The multi-axis cross modal attention encoder 302-A can process the combined sequence 410 using the multiple multi-axis encoder blocks 402 by mapping the input elements of the project 214 onto a latent space, and then applying self-attention across both spatial and temporal dimensions simultaneously to the input elements of the combined sequence 410 in the latent space.

In some examples, the multi-axis cross modal attention encoder 302-A has a latent query attention architecture, which includes a multi-axis latent query encoder block 404 and multiple multi-axis encoder blocks 402. In this example, the multi-axis cross modal attention encoder 302-A can process the combined sequence 410 using the multi-axis latent query encoder blocks 404 and the multiple multi-axis encoder blocks 402 by applying self-attention across both spatial and temporal dimensions simultaneously to the input elements of the projection 214.

Alternatively, the cross modal attention encoder 302 can be a factorized cross modal attention encoder 302-B. The factorized cross modal attention encoder 302-B can have a sequential attention architecture or an interleaved attention architecture. Depending on the encoder architecture, the factorized cross modal attention encoder 302-B can include multiple spatial encoder blocks 406, temporal encoder blocks 408, or both.

The factorized cross modal attention encoder 302-B with sequential attention architecture includes a set of multiple temporal encoder blocks 408 and a set of multiple spatial encoder blocks 406. The set of multiple temporal encoder blocks 408 has the same amount of encoder blocks as the set of multiple spatial encoder blocks 406.

Figure 5:
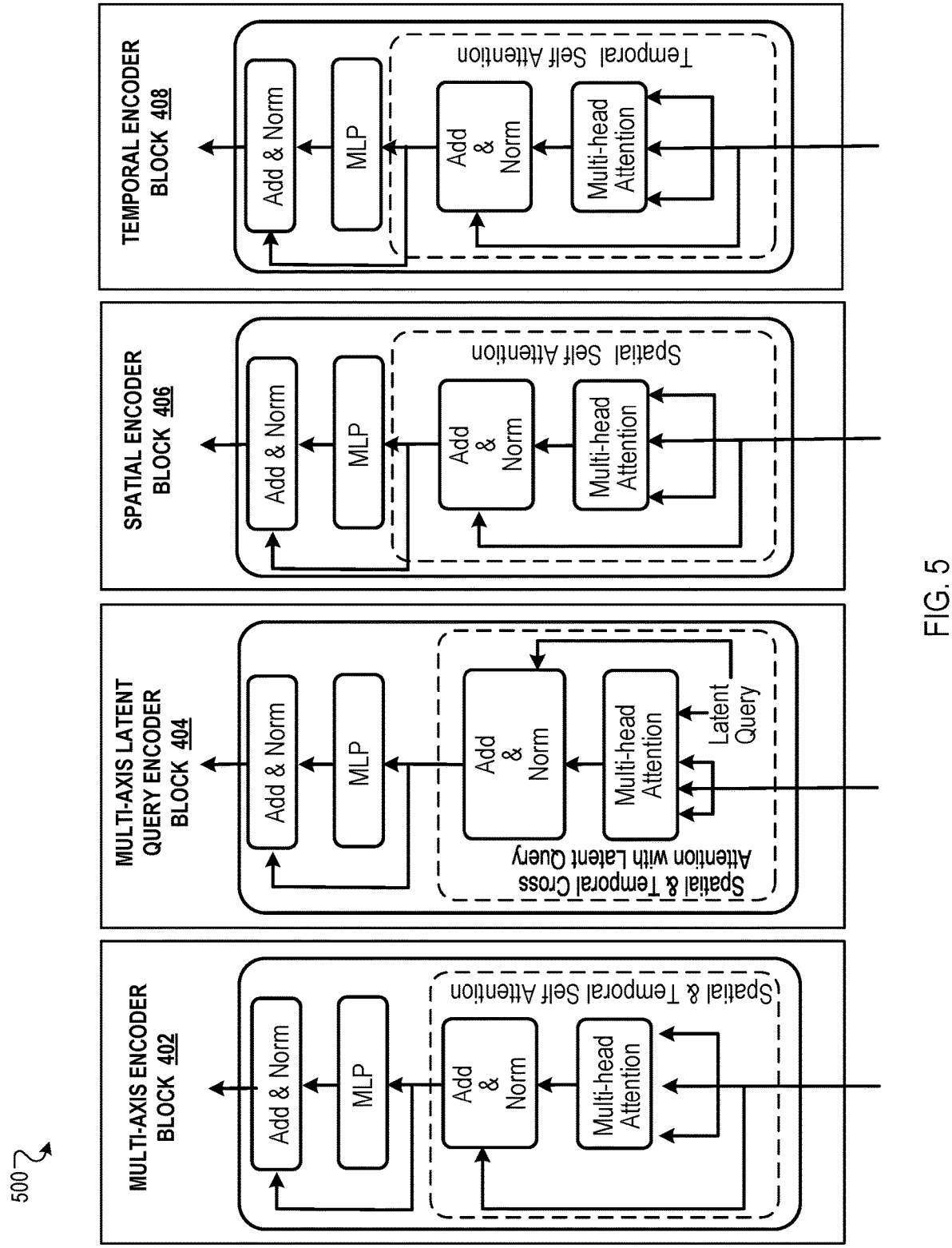
FIG. 5 is a block diagram of example encoder blocks.

The factorized cross modal attention encoder 302-B can process the combined sequence 410 by applying self-attention to the input elements of the combined sequence 410 along the temporal dimension using the set of multiple temporal encoder blocks 408, and the factorized cross modal attention encoder 302-B can then apply self-attention to the input elements of the combined sequence 410 along the spatial dimension using the set of multiple spatial encoder blocks 406, as described in further detail below with reference to FIG. 5.

In some examples, the factorized cross modal attention encoder 302-B has an interleaved attention architecture, which includes "interleaved" spatial encoder blocks 406 and temporal encoder blocks 408 (e.g., multiple sets of two encoder blocks including a temporal encoder block 408 followed by a spatial encoder block 406 or a spatial encoder block 406 followed by a temporal encoder block 408). In this example, the factorized cross modal attention encoder 302-B can process the combined sequence 410 using the multiple interleaved sets of spatial encoder blocks and temporal encoder blocks by applying self-attention across the spatial dimension and temporal dimension, as described in further detail below with reference to FIG. 5.

FIG. 5 is a block diagram of example encoder blocks. For convenience, the one or more encoder blocks will be described as being implemented by a system of one or more computers located in one or more locations, e.g., the on-board system 110 of FIG. 1.

The encoder block can be a multi-axis encoder block 402, a multi-axis latent query encoder block 404, a spatial encoder block 406, or a temporal encoder block 408.

As described above, each input element corresponds to a respective time point along a temporal dimension and a respective spatial entity along a spatial dimension.

The encoder block can process each input element of the combined sequence by applying attention across the temporal dimension, the spatial dimension, or both.

For example, the multi-axis encoder block 402 can perform spatial and temporal self-attention of the projection by self-attending over each of the input elements using a multi-head attention block and adding and normalizing the input elements using an add & norm block. In particular, the multi-axis encoder block 402 updates each of the input elements based on the index of the input elements by attending over the input elements having the index over both the temporal dimension and the spatial dimension. The multi-axis encoder block 402 can then process the normalized input elements using a multilayer perceptron (MLP) and re-normalize the input elements using a second add & norm block.

In another example, the multi-axis latent query encoder block 404 can perform spatial and temporal self-attention of the projection by self-attending over each of the input elements using a multi-head attention block and adding and normalizing the input elements using an add & norm block. In particular, the multi-axis latent query encoder block 404 updates each of the input elements in a latent space based on the index of the input elements by attending over the input elements having the index. The multi-axis latent query encoder block 404 can use a latent query from the latent space to update the input elements and to normalize the input elements after performing self-attention over both the temporal dimension and the spatial dimension. The multi-axis latent query encoder block 404 can then process the normalized input elements using a multilayer perceptron (MLP) and re-normalize the input elements using a second add & norm block.

In another example, the spatial encoder block 406 can perform spatial self-attention of the projection by self-attending over each of the input elements using a multi-head attention block and adding and normalizing the input elements using an add & norm block. In particular, the spatial encoder block 406 updates each of the input elements based on the index of the input elements by attending over the input elements having the index over the spatial dimension. The spatial encoder block 406 can then process the normalized input elements using a multilayer perceptron (MLP) and re-normalize the input elements using a second add & norm block.

In another example, the temporal encoder block 408 can perform spatial self-attention of the projection by self-attending over each of the input elements using a multi-head attention block and adding and normalizing the input elements using an add & norm block. In particular, the temporal encoder block 408 updates each of the input elements based on the index of the input elements by attending over the input elements having the index over the temporal dimension. The spatial encoder block 406 can then process the normalized input elements using a multilayer perceptron (MLP) and re-normalize the input elements using a second add & norm block.

Figure 6:
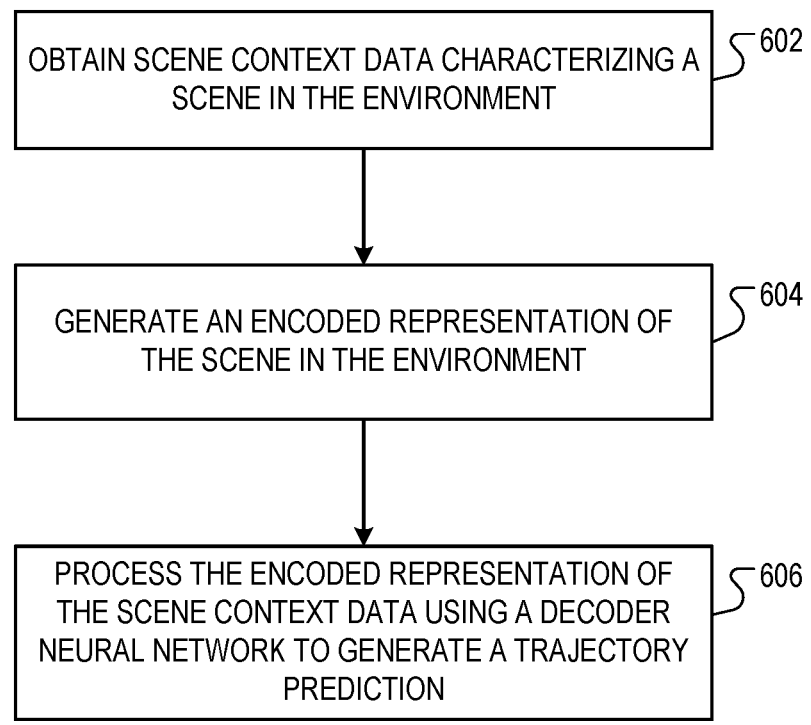
FIG. 6 is a flow diagram of an example process for generating trajectory predictions for one or more target agents.

FIG. 6 is a flow diagram of an example process 600 for generating trajectory predictions for one or more target agents. For convenience, the process 600 will be described as being performed by a system of one or more computers located in one or more locations. For example, a system, e.g., the system 100 of FIG. 1, appropriately programmed in accordance with this specification, can perform the process 600.

The system obtains scene context data characterizing a scene in the environment (602). The scene can include multiple agents, such as a target agent and one or more context agents. The target agent is an agent in the vicinity of the autonomous vehicle in the environment.

The scene context data includes respective context data for each of multiple different modalities of context data (e.g., traffic light state data, road graph data, history data, and agent interaction data). The scene context data includes data generated from data that simulates data that would be captured by one or more sensors of an autonomous vehicle in the real-world environment, and the target agent is a simulated agent in a vicinity of the simulated autonomous vehicle in the computer simulation.

The system generates an encoded representation of the scene in the environment (604). The encoded representation includes one or more embeddings.

In particular, for each modality, the system generates a respective sequence of input elements from the context data for the modality. Each input element corresponds to a respective time point along a temporal dimension, and wherein the attention-based encoder neural network comprises one or more temporal cross-modal attention layer blocks that self-attend over input elements corresponding to each of the multiple different modalities along the temporal dimension.

The system generates an initial sequence of input elements for the modality from the context data for the modality, and the system processes the initial sequence using an attention neural network that is specific to the modality to generate the sequence of input elements (e.g., a tensor having a same feature dimension as the initial sequence). The system can then project the context data for the modality into a sequence of input elements that each have a dimensionality that is shared across the modalities, and the system can apply positional embedding to each of the input elements.

The system then generates a combined sequence by concatenating the respective sequences of each modality, and the system processes the combined sequence using an attention-based encoder neural network (e.g., attention encoder) to generate the one or more embeddings. The attention encoder includes at least one cross-modal attention layer block (e.g., a cross modal attention encoder) that attends over input elements corresponding to each of the multiple different modalities.

In some examples, for each index along the temporal dimension, each temporal cross-modal attention layer block updates the input elements having the index by attending over the input elements having the index. In some other examples, the attention-based encoder neural network comprises one or more spatial attention layer blocks that self-attend over input elements along the spatial dimension. For each index along the spatial dimension, each spatial cross-modal attention layer block updates the input elements having the index by attending over the input elements having the index.

In some examples, the attention encoder also receives as input a set of learned queries. In this example, the attention encoder includes one or more self-attention layer blocks that update the learned queries by applying self-attention over the learned queries, and one or more cross-attention cross-modal layer blocks that update the learned queries by applying cross-attention between the learned queries and the combined sequence.

The system processes the encoded representation of the scene context data using a decoder neural network to generate a trajectory prediction (606). In some examples, the encoded representation of the scene in the environment comprises a respective embedding for each input element in the combined sequence. In some other examples, the encoded representation of the scene in the environment comprises a respective embedding for each learned query.

The system uses the decoder neural network (e.g., the trajectory decoder) to generate the trajectory prediction for the target agents, which predicts a future trajectory of the target after the current time point. In particular, the trajectory prediction output defines a probability distribution over possible future trajectories of the target agent after the current time point.

In some implementations, the trajectory prediction output is generated on-board the autonomous vehicle.

In these implementations, the system can then provide the trajectory prediction output for the target agent, data derived from the trajectory prediction output, or both to an on-board system of the autonomous vehicle for use in controlling the autonomous vehicle. In some other examples, the system can provide trajectory prediction output, data derived from the trajectory prediction output, or both for use in controlling the simulated autonomous vehicle in the computer simulation.

This specification uses the term "configured" in connection with systems and computer program components. For a system of one or more computers to be configured to perform particular operations or actions means that the system has installed on IT software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
    obtaining scene context data characterizing a scene in an environment at a current time point, wherein the scene includes a plurality of agents comprising a target agent and one or more context agents, and the scene context data comprises respective context data for each of multiple different modalities of context data, wherein the scene context data comprises data generated from data captured by one or more sensors of an autonomous vehicle, and wherein the target agent in the set is an agent in a vicinity of the autonomous vehicle in the environment;
    generating an encoded representation of the scene in the environment that comprises one or more embeddings, comprising:
        generating, for each of the multiple different modalities, a respective sequence of input elements for the modality from the context data for the modality;
        generating a combined sequence by concatenating the respective sequences of input elements for each of the different modalities; and
        processing the combined sequence using an attention-based encoder neural network to generate the one or more embeddings, wherein the attention-based encoder neural network comprises at least one cross-modal attention layer block that attends over input elements corresponding to each of the multiple different modalities;
    processing the encoded representation of the scene context data using a decoder neural network to generate a trajectory prediction output for the target agent that predicts a future trajectory of the target agent after the current time point; and
    providing at least one of the trajectory prediction output for the target agent or data derived from the trajectory prediction output to a planning system to control navigation of the autonomous vehicle.

2. The method of claim 1, wherein the trajectory prediction output defines a probability distribution over possible future trajectories of the target agent after the current time point.

3. The method of claim 1, wherein the trajectory prediction output is generated on-board the autonomous vehicle.

4. The method of claim 1, wherein the scene context data comprises target agent history context data characterizing current and previous states of the target agent.

5. The method of claim 1, wherein the scene context data comprises context agent history context data characterizing current and previous states of each of the one or more context agents.

6. The method of claim 1, wherein the scene context data comprises road graph context data characterizing road features in the scene.

7. The method of claim 1, wherein the scene context data comprises traffic signal context data characterizing at least respective current states of one or more traffic signals in the scene.

8. The method of claim 1, wherein generating, for each of the multiple different modalities, a respective sequence of input elements for the modality from the context data for the modality comprises, for each of the modalities:
generating an initial sequence of input elements for the modality from the context data for the modality; and
processing the initial sequence using an attention neural network that is specific to the modality to generate the sequence of input elements.

9. The method of claim 1, wherein generating, for each of the multiple different modalities, a respective sequence of input elements for the modality from the context data for the modality comprises, for each of the modalities:
projecting the context data for the modality into a sequence of input elements that each have a dimensionality that is shared across the modalities.

10. The method of claim 9, wherein projecting the context data for the modality into a sequence of input elements that each have a dimensionality that is shared across the modalities comprises:
projecting the context data for the modality into a sequence of input elements that each have a dimensionality that is shared across the modalities without applying attention over the context data.

11. The method of claim 9, wherein generating, for each of the multiple different modalities, a respective sequence of input elements for the modality from the context data for the modality comprises, for each of the modalities:
applying positional embedding to each of the input elements.

12. The method of claim 11, wherein the context data for each modality is represented as a tensor having a feature dimension, and wherein projecting the context data comprises projecting the feature dimension to have the shared dimensionality.

13. The method of claim 1, wherein each input element corresponds to a respective time point along a temporal dimension, and wherein the attention-based encoder neural network comprises one or more temporal cross-modal attention layer blocks that self-attend over input elements corresponding to each of the multiple different modalities along the temporal dimension.

14. The method of claim 13, wherein, for each index along the temporal dimension, each temporal cross-modal attention layer block updates the input elements having the index by attending over the input elements having the index.

15. The method of claim 14, wherein each input element corresponds to a respective spatial entity along a spatial dimension and wherein the attention-based encoder neural network comprises one or more spatial attention layer blocks that self-attend over input elements along the spatial dimension.

16. The method of claim 15, wherein, for each index along the spatial dimension, each spatial cross-modal attention layer block updates the input elements having the index by attending over the input elements having the index.

17. The method of claim 13, wherein the encoded representation of the scene in the environment that comprises a respective embedding for each input element in the combined sequence.

18. The method of claim 1, wherein the attention-based encoder neural network also receives as input a set of learned queries and comprises:
(i) one or more self-attention layer blocks that update the learned queries by applying self-attention over the learned queries, and
(ii) one or more cross-attention cross-modal layer blocks that update the learned queries by applying cross-attention between the learned queries and the combined sequence.

19. The method of claim 18, wherein the encoded representation of the scene in the environment comprises a respective embedding for each learned query.

20. The method of claim 1, further comprising:
controlling, by the planning system of the autonomous vehicle, the autonomous vehicle to navigate in the environment based on (i) the trajectory prediction output for the target agent, (ii) data derived from the trajectory prediction output, or (iii) both.

21. A system comprising:
one or more computers; and
one or more storage devices storing instructions that, when executed by the one or more computers, cause the one or more computers to perform operations comprising:
obtaining scene context data characterizing a scene in an environment at a current time point, wherein the scene includes a plurality of agents comprising a target agent and one or more context agents, and the scene context data comprises respective context data for each of multiple different modalities of context data, wherein the scene context data comprises data generated from data captured by one or more sensors of an autonomous vehicle, and wherein the target agent in the set is an agent in a vicinity of the autonomous vehicle in the environment;
generating an encoded representation of the scene in the environment that comprises one or more embeddings, comprising:
generating, for each of the multiple different modalities, a respective sequence of input elements for the modality from the context data for the modality;
generating a combined sequence by concatenating the respective sequences of input elements for each of the different modalities; and
processing the combined sequence using an attention-based encoder neural network to generate the one or more embeddings, wherein the attention-based encoder neural network comprises at least one cross-modal attention layer block that attends over input elements corresponding to each of the multiple different modalities;
processing the encoded representation of the scene context data using a decoder neural network to generate a trajectory prediction output for the target agent that predicts a future trajectory of the target agent after the current time point; and
providing at least one of the trajectory prediction output for the target agent or data derived from the trajectory prediction output to a planning system to control navigation of the autonomous vehicle.

22. The system of claim 21, wherein the trajectory prediction output defines a probability distribution over possible future trajectories of the target agent after the current time point.

23. The system of claim 21, wherein the trajectory prediction output is generated on-board the autonomous vehicle.

24. One or more non-transitory computer-readable storage media storing instructions that when executed by one or more computers cause the one or more computers to perform operations comprising:

obtaining scene context data characterizing a scene in an environment at a current time point, wherein the scene includes a plurality of agents comprising a target agent and one or more context agents, and the scene context data comprises respective context data for each of multiple different modalities of context data, wherein the scene context data comprises data generated from data captured by one or more sensors of an autonomous vehicle, and wherein the target agent in the set is an agent in a vicinity of the autonomous vehicle in the environment;

generating an encoded representation of the scene in the environment that comprises one or more embeddings, comprising:

generating, for each of the multiple different modalities, a respective sequence of input elements for the modality from the context data for the modality;

generating a combined sequence by concatenating the respective sequences of input elements for each of the different modalities; and processing the combined sequence using an attention-based encoder neural network to generate the one or more embeddings, wherein the attention-based encoder neural network comprises at least one cross-modal attention layer block that attends over input elements corresponding to each of the multiple different modalities;

processing the encoded representation of the scene context data using a decoder neural network to generate a trajectory prediction output for the target agent that predicts a future trajectory of the target agent after the current time point; and providing at least one of the trajectory prediction output for the target agent or data derived from the trajectory prediction output to a planning system to control navigation of the autonomous vehicle.

25. The one or more non-transitory computer-readable storage media of claim 24, wherein the trajectory prediction output defines a probability distribution over possible future trajectories of the target agent after the current time point.

* * * * *